United States Patent

Murdock, Sr.

[15] 3,664,093
[45] May 23, 1972

[54] SEPARATOR VESSEL HAVING MULTIPLE PARALLEL SEPARATOR PLATES

[72] Inventor: Forrest L. Murdock, Sr., 2420 East 24th St., Tulsa, Okla. 74114

[22] Filed: Apr. 22, 1970

[21] Appl. No.: 30,843

[52] U.S. Cl. ................................................55/174, 55/206
[51] Int. Cl. .........................................................B01d 19/00
[58] Field of Search .....................55/42, 174, 175, 186, 193, 55/206, 308, 321, 445, 525; 210/532

[56] References Cited

UNITED STATES PATENTS

| | | | |
|---|---|---|---|
| 2,636,572 | 4/1953 | Fleisher | 55/443 |
| 3,078,648 | 2/1963 | Edmondson | 55/206 X |
| 3,208,204 | 9/1965 | Perrson | 55/525 X |
| 3,212,234 | 10/1965 | McMinn | 55/174 X |

*Primary Examiner*—Reuben Friedman
*Assistant Examiner*—R. W. Burks
*Attorney*—Head & Johnson

[57] ABSTRACT

This invention relates to a means for separating solids from fluid or gas, fluids from gas, and commingled immiscible fluids from each other when one portion of such fluids has a heavier specific gravity than the other. When used to separate commingled immiscible fluids the invention includes a vessel having a fluid inlet, a light fluid outlet and a heavy fluid outlet, the outlets being spaced from the inlet, and a plurality of spaced apart parallel separator screens positioned within the vessel between the inlet and the outlet arranged such that fluid flowing from the inlet to the outlet passes through the separator screens, each separator screen being a planar foraminous reticulum of integrally formed relatively small width and small thickness strands, all of which are longitudinally downwardly inclined providing a multiplicity of continuous uninterrupted downwardly inclined paths on which coalesced droplets of heavier fluid may travel towards the bottom of the vessel.

6 Claims, 9 Drawing Figures

Patented May 23, 1972
3,664,093
3 Sheets-Sheet 1
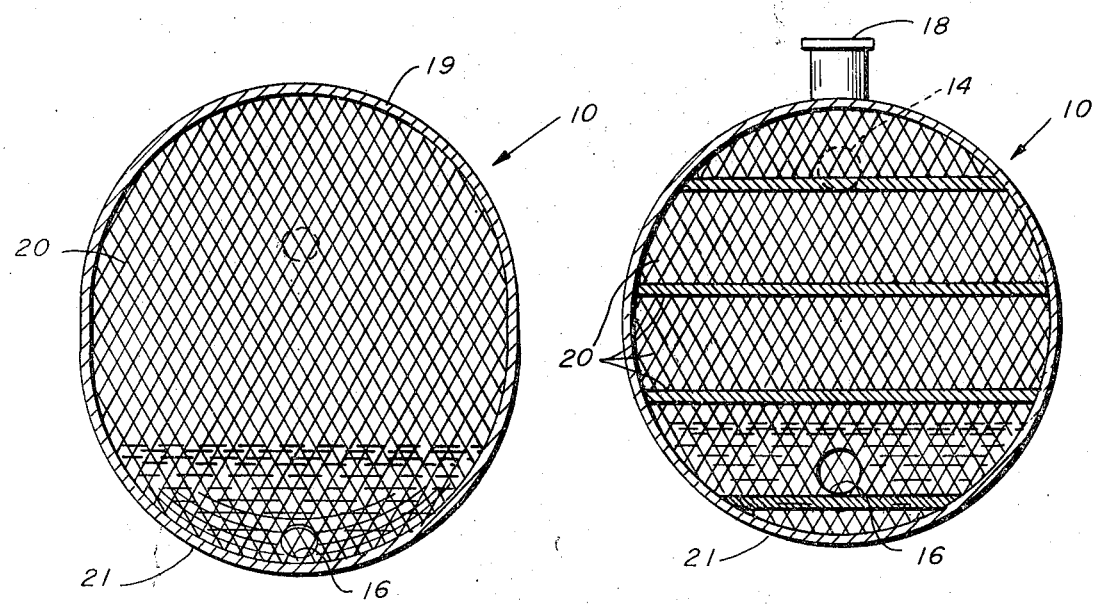
FIG. 2
FIG. 3
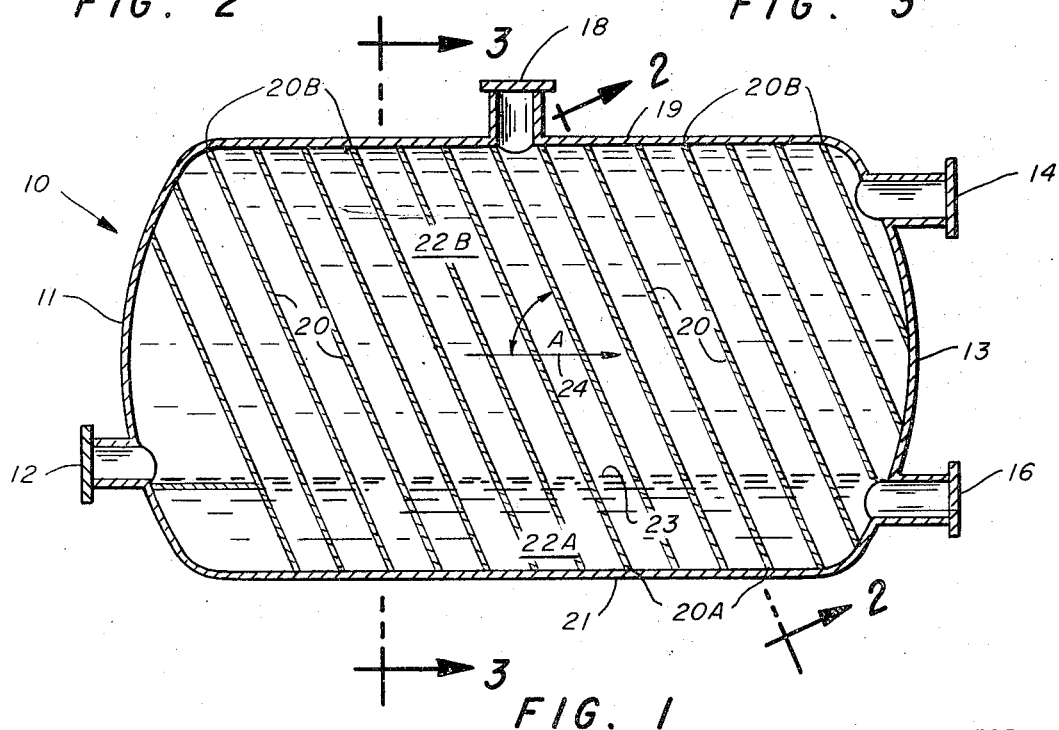
FIG. 1
INVENTOR.
FORREST L. MURDOCK, SR
BY
*Head & Johnson*
ATTORNEYS INVENTOR,
FORREST L. MURDOCK, SR
BY Head & Johnson
ATTORNEYS Patented May 23, 1972

INVENTOR.
FORREST L. MURDOCK, SR

BY *Head & Johnson*

ATTORNEYS

SEPARATOR VESSEL HAVING MULTIPLE PARALLEL SEPARATOR PLATES

BACKGROUND, SUMMARY AND OBJECTS OF THE INVENTION

The need for a means for separating solids from fluid or gas and commingled immiscible fluids from each other is frequently encountered in the chemical and petroleum industries. A typical example which will be utilized for purposes of illustrating the invention, but which is by no means the only application of the invention, is that of separating water entrained in petroleum products, especially petroleum crude. Most crude oil has some water entrained in it. In order for efficient and economical transportation and refining of crude oil it is important that as much as possible of the water be removed and at the least expense.

The method of separating water from crude presently utilized in the petroleum industry is to subject the crude to a sequence of steps. One commonly used step is that of subjecting the water bearing crude to a quiescent settling zone or tank wherein the water is given an opportunity to settle from the crude, the water being withdrawn from the bottom of the tank. Another step frequently used is to heat the water bearing crude, thereby lowering the viscosity which permits the water to more readily settle out. Another treatment includes subjecting the water bearing crude to an electric field which, under proper conditions, tends to cause small water droplets to coalesce into larger droplets which more easily settle out of the crude. An important means of treatment includes subjecting the water bearing crude to a filter material which provides a great surface area on which water may coalesce and form into large droplets which settle out of the crude. It is towards this last means of separation, that is, positioning in an enclosed container facilitates explosing a large total surface area on which water droplets may coalesce for subsequent separation from the crude that this invention is primarily directed.

A common means of providing large surface areas for coalescing water in crude is the use of excelsior, and other similar products, both natural and synthetic, normally used in an arrangement in which the fluid flow is vertically upward through the excelsior. While excelsior type products are effective to a degree in achieving the desired results some problems and limitations are encountered. Excelsior has a limited life span in that, being organic, it will decompose. Excelsior, or any equivalent natural or synthetic fibrous type material, has a tendency to clog easily with dirt, debris, and other contamination so that, in many instances, frequent replacement is required. The results of clogging due to collection of debris and contaminants tends to cause the fluid to channel, that is, the fluid flows through the filter media in small channels so that only a relatively small percent of the filter medium is actually effectively utilized. Another difficulty with the use of excelsior and similar configured natural and synthetic materials is that such materials are, by their nature, randomly oriented, having no preferential direction of inclination of elongated components. For this reason water droplets coalescing on such material are not preferentially downwardly oriented in their flow path, and therefore droplets easily detach from horizontal portions of the filter medium and become resuspended in the fluid stream.

This invention provides a means for separating solids from fluid or gas, fluids from gas, and commingled immiscible fluids from each other which overcome the disadvantages of known types of separators and which particularly overcome the disadvantages of known types of separators and which particularly overcome the disadvantages of excelsior type separator material.

It is therefore a general object of this invention to provide an improved means for separating commingled immiscible fluids.

Another object of this invention is to provide a means for separating commingled immiscible fluids of divergent specific gravities including means of providing a large amount of surface area on which droplets of heavier fluid may coalesce including means wherein all portions of such surface area are downwardly directed to provide uninterrupted downwardly inclined paths on which coalesced droplets of heavier fluid may travel.

Another object of this invention is to present a separator for separating solids from fluid or gas, fluids from gas, and immiscible fluids from each other in which the flow through the separator is horizontal.

Another more particular object of this invention is to provide a vessel incorporating the improved separating means of this invention.

Another object of this invention is to provide an apparatus for mixing solids and liquids with gas, solids with liquids, and for emulsifying immiscible fluids.

These as well as other objects of the invention will be understood in light of the following description and claims, taken in conjunction with the attached drawings.

DESCRIPTION OF THE VIEWS

FIG. 1 is a cross-sectional view of a vessel incorporating the improved means for separating commingled immiscible fluids of this invention.

FIGS. 2 and 3 are cross-sectional views taken along the lines 2—2 and 3—3 respectively of FIG. 1.

FIG. 4 is a side view, shown partially cut-away and in cross section, of a heater-treater vessel incorporating the improved separating means of this invention FIGS. 5, 6, 7, 8 and 9 are fragmentary views of separator screens showing some of the various configurations which may be utilized.

DETAILED DESCRIPTION

Figure 4:
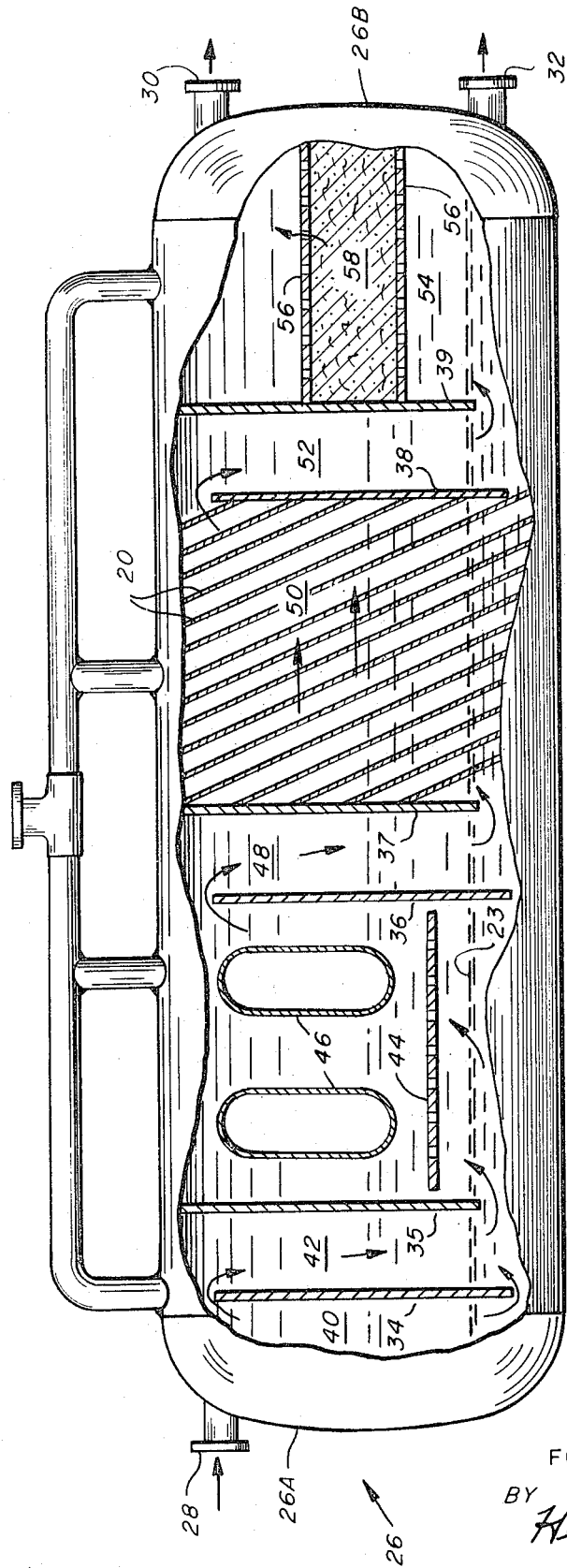

While the invention is equally as applicable to the separation of solids and fluids from gas, solids from fluids, and one immiscible fluid from another, the invention will be described as it particularly relates to the separation of one immiscible fluid from another.

Referring first to FIGS. 1, 2 and 3, an embodiment of the invention is illustrated. The separator includes a vessel generally indicated by the numeral 10 having at the inlet end 11 a fluid inlet 12, and at outlet end 13, a light fluid outlet 14 and a heavy fluid outlet 16, the light fluid outlet 14 being above the heavy fluid outlet 16. The vessel may also include a gas outlet 18 in the upper portion 19 thereof, the vessel bottom being identified by numeral 21. While fluid outlet 16 is shown in outlet end 13 it may be placed in bottom 21. In addition a fluid sump may be provided in bottom 21 for some applications.

Positioned within the vessel 10 are a plurality of spaced apart parallel separator screens 20. The separator screens 20 are positioned between the fluid inlet 12 and the outlets 14 and 16. In the illustrated arrangement each of the screens 20 extends from the top 19 to the bottom 21 of vessel 10. Heavier fluid 22A collects in the bottom of the vessel while lighter fluid 22B collects in the upper portion. The interface 23 between the lighter fluid 22B and the heavier fluid 23 is above the lower end of the filter screens 20. By means as shown in FIGS. 2 and 3 the separator screens extend from the top 19 and are in contact with the sides of the vessel so that all fluid flow from the inlet 12 to the light fluid outlet 14 must pass through the plurality of screens 20.

Screens 20 are arranged such that the angles of each (indicated by angle A) relative to the general direction of fluid flow, as indicated by the arrow 24 in FIG. 1, is at least 15° and not more than 90°.

Each of the filter screens is a planar foraminous reticulum of integrally formed relatively small width and small thickness strands, all of which are longitudinally downwardly inclined providing a multiplicity of continuous uninterrupted downwardly inclined paths on which coalesced droplets of heavier fluid may travel towards the bottom of vessel 10.

Figure 5:
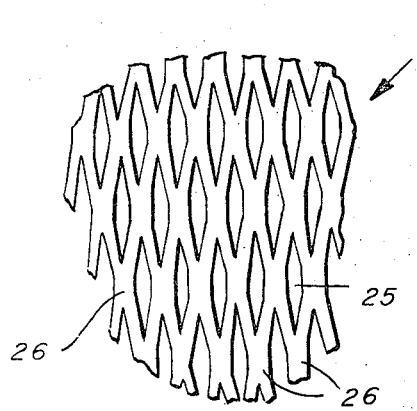
Figure 6:
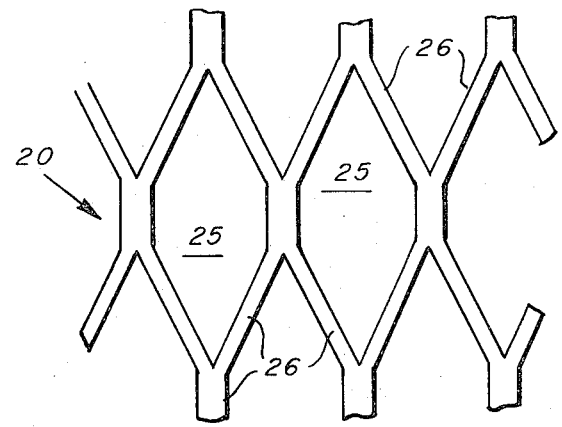
Figure 7:
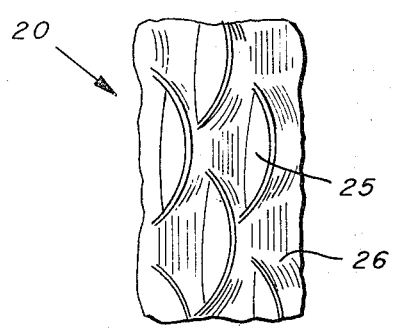
Figure 8:
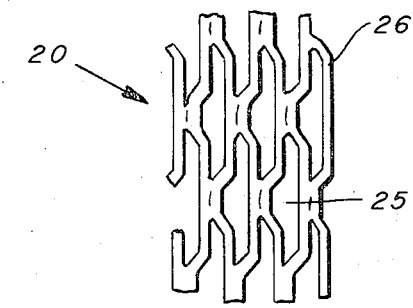
Figure 9:
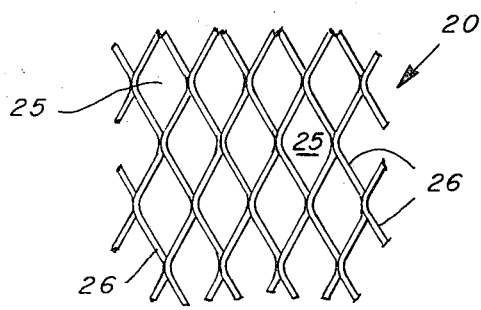

FIGS. 5-9 show enlarged portions of various configurations of filter screens 20. While the separator screens 20 may be formed of a variety of materials, a preferred embodiment includes the use of expanded metal, that is, metal which has been manufactured by sequential spaced slitting followed by a stretching of the metal into diamond-shaped openings 25, such as shown in FIGS. 5 and 6. Each diamond-shaped opening 25 is surrounded by strands 26 which interconnect into an integrally formed composite screen. Note that by reason of such arrangement droplets of heavier fluid which coalesce as the commingled fluid passes through the filter are provided with continuous uninterrupted downwardly inclined paths on which the droplets flow.

Separation of commingled fluids of divergent specific gravities is performed essentially by providing an environment in which there is a great amount of surface area on which droplets of the heavier liquid may coalesce. The droplets grow in size until they are sufficiently large to overcome the surface tension of the commingled fluid and pass downwardly in the fluid and collect in the heavier fluid stratum 22A in the bottom of the vessel. As previously stated, one of the most frequently utilized methods at the present time, and a method which has been utilized for many years, is subjecting commingled fluid to excelsior or some similar material. The essence of this invention is the provision of lattice configured separator screens in which all portions of the lattice provide an uninterrupted downward path on which coalesced droplets may flow until they reach the bottom of the vessel. The separator screen of this invention does not provide any point or area at which droplets of heavier fluid tend to leave the screen and fall into the flowing fluid.

It can be seen that coalesced droplets of heavier fluid which lose contact with a solid element and enter into the commingled fluid are subject to being carried by the commingled fluid out of the vessel with the lighter fluid stream. In addition, a droplet of heavier fluid which becomes detached from any physical support is subject to being dispersed into the commingled fluid and broken into smaller droplets. By the provision of this invention these possibilities are eliminated, or at least substantially reduced. Physical support is provided on which coalesced droplets may travel by surface adhesion from the top to the bottom of the vessel without becoming detached from the path provided and therefore with reduced possibility of re-entering the commingled stream.

In the preferred embodiment, as shown in FIG. 1, the lower end 20A of each of the separator screens 20 is positioned downstream from the upper end 20B. This means that each screen 20 tends to deflect fluid flowing therethrough downwardly. The heavier fluid components, which tend to coalesce onto the separator screens, are thereby urged downwardly toward the bottom of the vessel by the effect of fluid flow. The lighter components of the commingled stream are forced to rise upwardly against such downward deflection which further tends to separate the heavier components.

The physical structure in which the separator means of this invention is housed may vary considerably. FIG. 1 shows a very simple separator vessel. FIG. 4 shows the incorporation of the means for separating commingled immiscible fluids of this invention as a part of an overall heater-treater. Heater-treater vessel 26 has an inlet end 26A and an outlet end 26B, the inlet end 26A has an inlet opening 28 therein by which commingled immiscible fluids enter the vessel. Outlet end 26B includes an upper lighter fluid outlet 30 and a lower heavier fluid outlet 32. The vessel includes partitions 34 through 39, the partitions being generally parallel to each other and spaced from each other.

Between partition 34 and inlet end 26A is formed a quiescent zone 40 in which the heavier components of the commingled fluid tend to settle to the bottom. Fluid flows over the top of partition 34 and into a downward diverting chamber 42. The fluid flows underneath the partition 35 and up through a spreader 44, past heaters 46 wherein the temperature of the fluid is raised, and over the top of the partition 36.

The function of heaters 46 is to raise the temperatures of the commingled fluid, reducing the viscosity, and thereby facilitating the separation of the heavier fluid components.

Between partitions 36 and 37 is a second downwardly diverting chamber 48. Fluid flows underneath partition 37 and upwardly through a separator chamber 50. In chamber 50 are a plurality of spaced apart separator screens 20, the same as previously described in reference to FIG. 1. Separator screens 20 provide an exceedingly large total surface area on which coalesced drops of heavier fluid components may collect. The coalesced drops flow downwardly on uninterrupted paths to the lower portion of the vessel as previously described. Fluid flows generally horizontally with slight upward inclination through the separator chamber 50 and passes over the top of partition 38 into a third downward diverting chamber 52. Fluid flows from chamber 52 under partition 39 and upwardly within a final filter chamber 54. Within final filter chamber 54 horizontal apertured plates 56 are provided having filter media 58, such as excelsior therebetween.

The function of filter media 58 is to collect physical contaminant carried by the upwardly flowing stream and to afford the final opportunity for coalesced heavier fluid droplets to fall out.

The down flow chambers 42, 48 and 50 are provided to obtain reversal of fluid flow so that droplets of heavier fluid tend to be ejected from the fluid stream when the stream changes direction and moves upwardly in the succeeding chambers.

FIG. 4 is an example of the application of the separating means of this invention to a heater-treater embodiment as may typically by utilized in the petroleum industry for separating water from crude petroleum.

It can be seen that the physical embodiment of the principles of this invention may vary considerably. The number of separator screens utilized will depend upon the environment in which separation is to be achieved. The divergents between the specific gravities of the heavier versus the lighter components of the commingled fluid is one of the parameters effecting the number of screens required. The thoroughness of separation desired is another factor, with more thorough separation requiring a larger number of screens. The size of the openings through the screens varies according to the type of fluid being treated. Smaller openings result in a greater number of strands per square foot of screen area and therefore a greater total surface area on which heavier fluid components may coalesce, however, smaller openings also are more easily plugged by debris. Therefore the selection of the size of screen openings is predicted primarily upon choosing a screen in which the openings are just large enough to pass all expected contamination. The angle declination A of the plane of the screens from the general direction of fluid flow depends also on a great variety of parameters, including the relative specific gravities of the fluid components, the fluid viscosity and the flow rate through the separator.

The invention provides a means of separating commingled immiscible fluids having many advantages over known arrangements. A separator is provided having a very large total surface area on which droplets of heavier fluid may coalesce while at the same time maintaining a relatively low impedance to fluid flow. The energy required to pass fluid through the separator is small compared to other known separating means. Another advantage is that servicing of the separator of this invention is minimized since the separation system does not depend upon forcing the commingled fluid through finely matted material. The separator plates 20 are arranged such that no clogging will occur if the screens are selected having openings of a size sufficient to pass all expected contamination. The life expectancy of the separator system of this invention, if proper materials are selected is practically unlimited.

The invention has been described as it relates to the specific application of separating one immiscible fluid from another. If provision is made for more than one fluid interface within the vessel 10, with an outlet 14 above each interface, it can be seen that the invention may be used for separating three or more fluids, each having a different specific gravity, in the same way as two fluids are separated in the above description.

When used to separate solids and fluids from gas, or solids from fluids, the invention functions is the same way as previously described. The inclination of the separator screens 20 force the heavier components downward towards the bottom of the vessel where they may be withdrawn, the lighter components passing against such downward deflection towards the top of the vessel. By this means solids from liquids, such as solids from sewage effluent, dust from air or gas, cutting from drilling mud, and so forth, may be separated. This is not to imply that the invention has application to every separation problem and in many circumstances other separation means or filter arrangements, may be more effective or less expensive.

By reversing the direction of flow through the vessel 10 the effect of the invention may be reversed. That is, opening 14 may be used for a heavy fluid inlet, opening 16 for a light fluid inlet, and opening 12 for an emulsion outlet. The same characteristics which cause separation in one direction of fluid flow cause emulsification in the opposite fluid flow direction. When the invention is used in an emulsifier, or mixer, usually higher flow rates may be employed compared to rates used for separation. "Fluid" as used in the claims includes liquids, gases and vapors.

While the invention has been described with a certain degree of particularity it is manifest that many changes may be made in the details of construction and the arrangement of components without departing from the spirit and scope of this disclosure. The invention is not limited to the embodiments disclosed but is limited only by the scope of the claim or claims, including the full rang of equivalency to which each step thereof is entitled.

What is claimed:

1. A means for separating heavier from lighter components commingled in fluids, including commingled immiscible fluids, one having a heavier specific gravity than the other, comprising:

a vessel having a fluid inlet, a light component outlet, and a heavy component outlet, the outlets being spaced from the inlet, the light component outlet being above the heavy component outlet; and a plurality of spaced apart, paralleled separator screens positioned within said vessel between said inlet and said outlet openings arranged such that fluid flowing from said fluid inlet to said light component outlet flows through said screens, each separator screen being a planar foraminous reticulum of integrally formed relatively small width and small thickness strands all of which are longitudinally downwardly inclined providing a multiplicity of continuous uninterrupted downwardly inclined paths on which heavier components may travel towards the bottom of said vessel for discharge outsaid heavy component outlet.

2. A means for separating heavier from lighter components commingled in fluids, including commingled immiscible fluids according to claim 1 wherein said separator screens are formed of lattice configured expanded metal.

3. A means for separating heavier from lighter components commingled in fluids, including commingled immiscible fluids according to claim 1 in which said vessel and said openings therein are arranged such that the flow of fluid therein from said inlet opening towards said outlet opening is such that the direction of fluid flow is generally horizontal and wherein said separator screens are positioned at an angle of at least 15° and not more than 90° relative to the horizontal, the lowermost portion of each of said screens being displaced in the direction of fluid flow relative to the uppermost portions.

4. A means for separating heavier from lighter components commingled in fluids, including commingled immiscible fluids according to claim 1 wherein said separator screens are formed of slit and stretched expanded metal, the apertures therein being of diamond shape.

5. A means for separating heavier from lighter components commingled in fluids, including commingled immiscible fluids according to claim 1 wherein said vessel includes a heater compartment having a heater means therein, said heater compartment having communication with said inlet, and a second compartment having said separator screens therein, said second compartment having communication with said outlets, and means communicating fluid flow from out of said first compartment into said second compartment.

6. A means for separating heavier from lighter components commingled in fluid, including commingled immiscible fluids according to claim 1 in which said vessel is in the form of a compartment within an elongated separator housing, the ends of said vessel being formed of partitions in said housing spaced apart and parallel to each other, the first of said partitions terminating at the lower end above the bottom of said separator housing, the space between the bottom of said first partition and the bottom of said separator housing providing said inlet, and said second partition being a partial partition, the partition top edge being below the top of said separator housing and the bottom edge being above the bottom of said separator housing, the spaces between the second partition and the top and bottom of said separator housing providing respectively said light component outlet and said heavy component outlet.

* * * * *